(12) United States Patent
Jiang

(10) Patent No.: US 10,110,936 B2
(45) Date of Patent: Oct. 23, 2018

(54) WEB-BASED LIVE BROADCAST

(71) Applicant: Shanghai Hode Information Technology Co., Ltd., Shanghai (CN)

(72) Inventor: Jun Jiang, Shanghai (CN)

(73) Assignee: Shanghai Hode Information Technology Co., Ltd., Shanghai (CN)

( * ) Notice: Subject to any disclaimer, the term of this patent is extended or adjusted under 35 U.S.C. 154(b) by 0 days.

(21) Appl. No.: 15/706,434

(22) Filed: Sep. 15, 2017

(65) Prior Publication Data
US 2018/0084292 A1   Mar. 22, 2018

(30) Foreign Application Priority Data

Sep. 18, 2016 (CN) .......................... 2016 1 0828135

(51) Int. Cl.
*G06K 9/46* (2006.01)
*H04N 21/2343* (2011.01)
*H04N 21/2187* (2011.01)
*H04N 9/87* (2006.01)

(52) U.S. Cl.
CPC ... *H04N 21/234345* (2013.01); *H04N 9/8722* (2013.01); *H04N 21/2187* (2013.01)

(58) Field of Classification Search
CPC ......... H04N 21/234345; H04N 9/8722; H04N 21/2187

USPC ........................................... 382/190; 348/661
See application file for complete search history.

(56) References Cited

U.S. PATENT DOCUMENTS

2015/0186744 A1* 7/2015 Nguyen ............... H04N 19/186
                                                        382/190

\* cited by examiner

*Primary Examiner* — Jefferey F Harold
*Assistant Examiner* — Omer Khalid
(74) *Attorney, Agent, or Firm* — Baker & Hostetler LLP

(57) ABSTRACT

The invention discloses a web-based live broadcasting method, which comprises the steps of real-time intercepting video information captured from a camera so as to obtain camera pictures; storing each frame of the camera picture as a texture object; rendering the texture object, and screening out a reference color of the pixels in the texture object; bonding the rendered texture object to a pre-set virtual background to obtain a bonded scene image information; and encoding the bonded scene image information to generate a video stream for live broadcasting. This invention further discloses a client terminal of web-based live broadcasting and a web-based live broadcasting system. The present invention can meet a requirement of a real-time processing on a picture during live broadcasting and can run smoothly on the mobile phone, with less consumption of resources.

14 Claims, 2 Drawing Sheets

WEB-BASED LIVE BROADCAST

CROSS-REFERENCE TO RELATED APPLICATION

The present application is based on and claims priority of Chinese patent application No. 201610828135.6, filed on Sep. 18, 2016. The entire disclosure of the above-identified application is hereby incorporated by reference herein and made a part of this specification.

FIELD OF THE INVENTION

The present invention relates to a field of communication, and more particularly to a client terminal of web-based live broadcasting, as well as a system and a method thereof.

BACKGROUND OF THE INVENTION

As a result that a limitation of a live broadcasting continues to be decreased, more and more users are beginning to try to be anchors. The conventional camera is now unable to meet users' personalized demands, so putting themselves in a virtual scene to do a live broadcasting has become a way to show their own personality.

SUMMARY OF THE INVENTION

A user may choose a color that is almost not shown in one's face as a background color, such as green. So one may prepare a green cloth as a background put behind characters to get an effect that only a green background is shown in the camera viewing window in addition to the characters. The green part is further changed into a transparent part by means of a software processing, and then mixed with a pre-selected virtual scene. Thereby, an effect of allocating in a virtual scene is obtained.

In comparing with photo processing, video processing is a higher challenge to the performance of computer. For 30 frames each having a 1280×960 resolution, the total pixels to be handled per minute approximate 37 million. As to frames each having a 1920×1080 resolution, more pixels will need to be handled. For those computers or mobile phones that simultaneously handle a live broadcasting, they will further bear a pressure from encoding video signals. This would be a big challenge to the performance of these kinds of equipment.

It is an object of the present invention to provide a client terminal of web-based live broadcasting as well as a system and a method thereof, which can meet in real time a request to handle the pictures in a live broadcasting, and can get, with a little resource consumption, a smooth operation even in a mobile phone.

In order to achieve the above object, the present invention is achieved by the following technical scheme and thus disclose a client terminal of web-based live broadcasting being characterized by comprising a camera, used to capture video information; a picture acquisition module connected to the camera for intercepting pictures from the camera in real time; a storage module connected to the picture acquisition module for storing each frame of the camera picture intercepted by the picture acquisition module as a texture object; a rendering module connected to the storage module for rendering the texture object stored in the storage module, and for screening out a reference color of the pixels in the texture object; a scene bonding module connected with the rendering module for bonding the rendered texture object to a pre-set virtual background to obtain a bonded scene information; an encoder connected to the scene bonding module for encoding the bonded scene information to generate a video stream for live broadcasting; and a data transmission module connected to the encoder to transmit the video stream for live broadcasting.

The picture acquisition module includes a screenshot unit, a data format judgment unit and a data format conversion unit connected in turn. The screenshot unit is connected with the camera for intercepting the video information to obtain the camera picture. The format judgment unit is connected with the storage module to determine the data format of the camera picture that is intercepted by the screenshot unit. If it is a YUV format, the intercepted camera picture is directly stored in the storage module, and if it is a RGB format, the RGB format camera picture will need to be converted into the YUV format by the format conversion unit and then be stored into the storage module.

The rendering module comprises a color filter unit as well as a transparency parameter setting unit and a reference color assignment unit, respectively connected thereto. The color filter unit is connected with the storage module and the scene bonding module, respectively. The reference color assignment unit is used to set the assigned key color as a reference color. The transparency parameter setting unit is used to set transparency parameters of the pixels. The color filter unit is used to filter out the reference color in pixels of a texture object stored in the storage module, and to set the transparency parameters of the pixels in the texture object.

A web-based live broadcasting system is also disclosed which is characterized by comprising a client terminal of web-based live broadcasting and a server thereof. The client terminal of web-based live broadcasting is used to generate a video stream for live broadcasting. The server receives the video stream pushed by the client terminal of web-based live broadcasting. Users send a request of watching a live broadcasting to the server so as to watch the video stream.

The client terminal of web-based live broadcasting comprise: a camera, used to capture video information; a picture acquisition module connected to the camera for intercepting pictures from the camera in real time; a storage module connected to the picture acquisition module for storing each frame of the camera picture intercepted by the picture acquisition module as a texture object; a rendering module connected to the storage module for rendering the texture object stored in the storage module, and for screening out a reference color of the pixels in the texture object, a scene bonding module connected with the rendering module for bonding the rendered texture object to a pre-set virtual background to obtain a bonded scene information; an encoder connected to the scene bonding module for encoding the bonded scene information to generate a video stream for live broadcasting; a data transmission module connected to the encoder to transmit the video stream for live broadcasting to a server.

The picture acquisition module includes a screenshot unit, a data format judgment unit and a data format conversion unit connected in turn. The screenshot unit is connected with the camera for intercepting the video information to obtain a camera picture. The format judgment unit is connected with the storage module to determine the data format of the camera picture that is intercepted by the screenshot unit. If it is a YUV format, the intercepted camera picture is directly stored in the storage module, and if it is a RGB format, the RGB format camera picture is converted into the YUV format by the format conversion unit and then be stored into the storage module.

The rendering module comprises a color filter unit as well as a transparency parameter setting unit and a reference color assignment unit, respectively connected thereto. The color filter unit is connected with the storage module and the scene bonding module, respectively. The reference color assignment unit is used to set the assigned key color as a reference color. The transparency parameter setting unit is used to set a transparency parameter of the pixels. The color filter unit is used to filter out the reference color in pixels of a texture object stored in the storage module, and to set the transparency parameters of the pixels in the texture object.

A web-based live broadcasting method is also disclosed which is characterized by comprising: real-time intercepting video information captured from a camera so as to obtain camera pictures; storing each frame of the camera picture as a texture object; rendering the texture object, and screening out a reference color of the pixels in the texture object; bonding the rendered texture object to a pre-set virtual background to obtain a bonded scene image information; encoding the bonded scene image information to generate a video stream for live broadcasting.

In the step of intercepting, it comprises a step of directly storing intercepted camera pictures if they are in a YUC format, and a step of converting intercepted camera pictures before storing them if they are RGB format.

A web-based live broadcasting method comprises: assigning a key color as the reference color; finding differential values between the colors of the pixels to be rendered and the reference color, and normalizing the differential values; utilizing a normalized differential values as a factor to multiple alpha channel values in the colors of the pixels to be rendered, so as to get alpha channel values of the colors of the pixels to be outputted, and to finish a screening of the reference color.

The reference color is green.

The present invention discloses a client terminal of a web-based live broadcasting, as well as a web-based live broadcasting system and a method thereof, and has advantages, in comparison to current technology, such as being possible to meet the requirement of real-time processing of the pictures in real time and being possible to run smoothly on the mobile phone, with less consumption of resources.

BRIEF DESCRIPTION OF THE DRAWINGS

In order to more clearly illustrate the embodiments of the disclosure, the accompanying drawings for illustrating the technical solutions and the technical solutions of the disclosure are briefly described as below.

DETAILED DESCRIPTION OF THE INVENTION

The invention will now be described in further detail with reference to the accompanying drawings, in which a preferred embodiment is set forth in detail.

Figure 1:
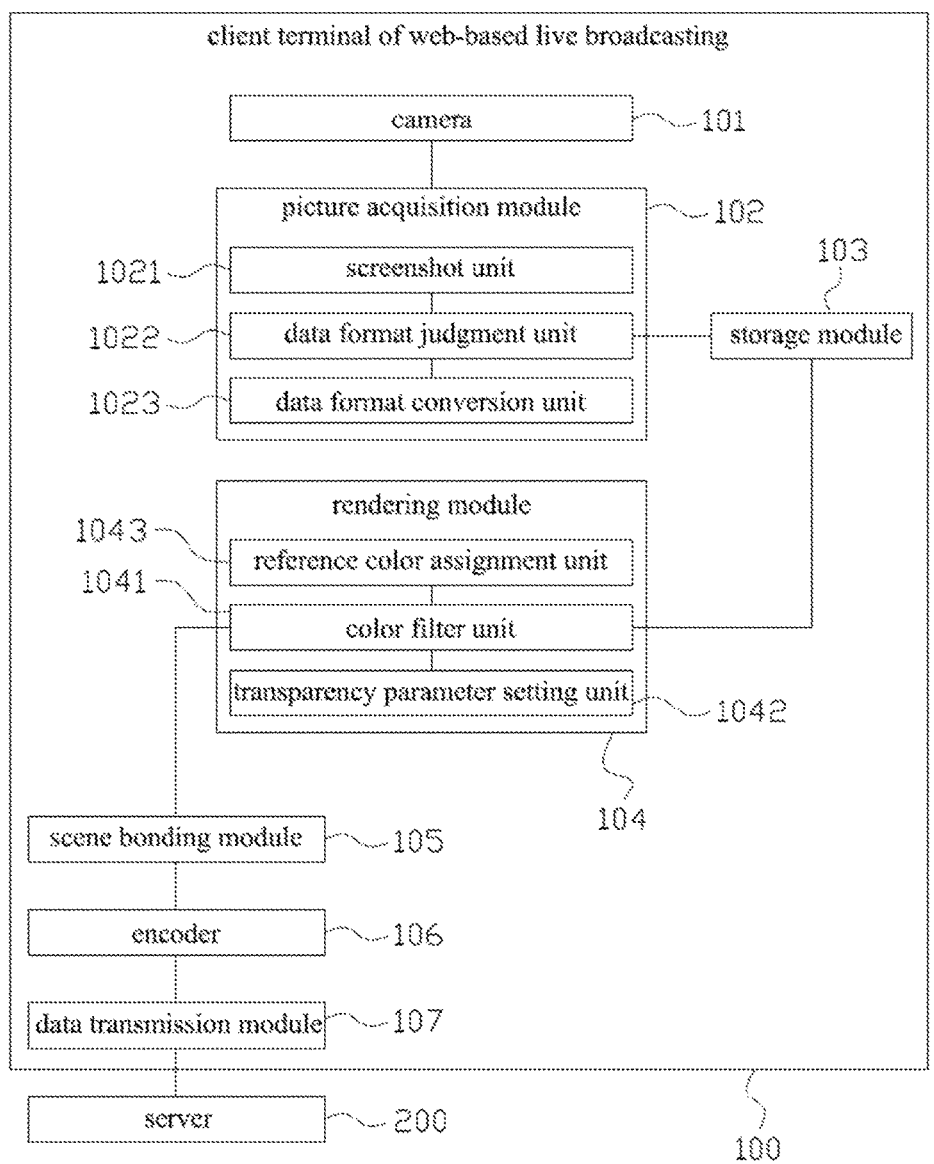
FIG. 1 is a structural block diagram of a web-based live broadcasting system disclosed in one embodiment of the present invention.
Figure 2:
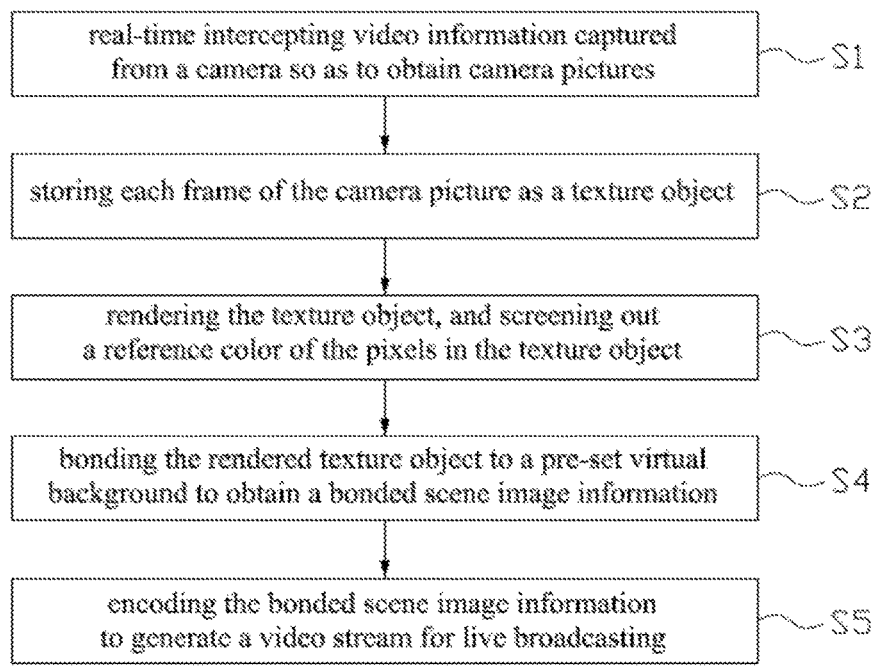
FIG. 2 is a flow chart of a web-based live broadcasting method disclosed in one embodiment of the present invention.

As shown in FIG. 1, a web-based live broadcasting system comprises a client terminal of web-based live broadcasting 100 and a server thereof 200. The client terminal of web-based live broadcasting 100 is used for generating a live video stream or a video stream for live broadcasting. The server 200 is used for receiving the video stream sent by the client terminal of web-based live broadcasting 100. User can send a watching request to the server 200 to review the video stream. The client terminal of web-based live broadcasting 100 includes a camera 101, used to capture video information; a picture acquisition module 102 connected to the camera 101 for intercepting pictures from the camera in real time; a storage module 103 connected to the picture acquisition module 102 for storing each frame of the camera picture intercepted by the picture acquisition module 102 as a texture object; a rendering module 104 connected to the storage module 103 for rendering the texture object stored in the storage module 103 and for screening out a reference color of the pixels in the texture object; a scene bonding module 105 connected with the rendering module 104 for bonding the rendered texture object to a pre-set virtual background to obtain a bonded scene information; an encoder 106 connected to the scene bonding module 105 for encoding the bonded scene information to generate a video stream for live broadcasting; and a data transmission module 107 connected to the encoder 106 to transmit the video stream for live broadcasting to the server 200.

In this embodiment, the picture acquisition module 102 includes a screenshot unit 1021, a data format judgment unit 1022, and a data format conversion unit 1023 connected in turn. The screenshot unit 1021 is connected with the camera 101 for intercepting the video information to obtain the camera picture. The format judgment unit 1022 is connected with the storage module 103 to determine the data format of the camera picture that is intercepted by the screenshot unit 1021. If it is a YUV format, the intercepted camera picture is directly stored in the storage module 103, and if it is a RGB format, the RGB format camera picture will need to be converted into the YUV format by the format conversion unit 1023 and then be stored into the storage module 103.

In this embodiment, the rendering module 104 comprises a color filter unit 1041 as well as a transparency parameter setting unit 1042 and a reference color assignment unit 1043, respectively connected thereto. The color filter unit 1041 is connected with the storage module 103 and the scene bonding module 105, respectively. The reference color assignment unit 1043 is used to set the assigned key color as a reference color. The transparency parameter setting unit 1042 is used to set transparency parameters of the pixels. The color filter unit 1041 is used to filter out the reference color in pixels of a texture object stored in the storage module 103, and to set the transparency parameters of the pixels in the texture object.

By incorporating with a web-based live broadcasting system mentioned above, the present invention also discloses a web-based live broadcasting method which comprises a first step of:

S1, real-time intercepting video information captured from a camera so as to obtain camera pictures.

Under a computer system of Windows, an application program called DirectShow or Video for Windows can be used to capture the camera pictures. Under an operation system of Android or Apple, a function provided in SDK can be directly used to capture the camera pictures.

Moreover, if the intercepted pictures are in a YUV format, they can be directly stored. If the intercepted pictures are in RGB format, they need to be converted into YUV format before being stored.

The method according to one embodiment of the present invention further comprise steps of:

S2, storing each frame of the camera picture as a texture object (one picture);

S3, rendering the texture object, and screening out a reference color of the pixels in the texture object.

The step of S3 further comprises steps of assigning a key color as the reference color, such as green; finding differential values between the colors of the pixels to be rendered and the reference color and normalizing the differential values; and utilizing a normalized differential values as a factor to multiple alpha channel values in the colors of the pixels to be rendered, so as to get alpha channel values of the colors of the pixels to be outputted, and to complete the screen of the reference color.

The rendering of the texture object is the key point of the embodiment of the present invention. In this embodiment of the present invention, the transparency of each pixel is adjusted using the Pixel Shader in accordance with certain rules, or parameters specified by the user.

The user needs to assign a key color as the reference color. In the pixel shader, differential values between the colors of the pixels to be rendered and the reference color assigned by the user are calculated and normalized. After that, a normalized differential value is utilized as a factor to multiple alpha channel values in the colors of the pixels to be rendered, so as to get alpha channel values of the colors of the pixels to be outputted finally.

During the rendering of the processed texture object into the scene, a color more close to the reference color assigned by user has an alpha channel value more close to 0, so as to get the purpose of screen out the reference color assigned by user. Finally, an effect of transparency appears for the background. And, only front scene is left. That is, the green color was removed, leaving the characters in the front scene.

Current graphics cards in market all support the function of "programmable rendering pipeline." Thus, during the rendering process, a self-defined program can be input to control the rendering steps. When the process is proceeded under Windows, for example rendering through Direct3D, a rendering logic can be defined in the Pixel Shader, so as to make a green screen behind the characters becoming transparent. When it is proceeded in a phone under Apple or Android system, the Fragment Shader in OpenGL ES can be used so as to make the green screen in background becoming transparent.

Specifically, the programmable rendering pipeline means that the graphic card allow a programmer to program the shader in a display operation unit during the process of rendering the scene, so as to control and manage the rendering effect achieved by the graphic card. There are two types of shaders, one is vertex shader and the other is pixel shader. The vertex shader is used for performing coordinate transformation and lighting calculation. Since the rendering of the camera picture does not involve a 3D transformation, so a vertex that is input to the shader is directly output without any processing. However, the pixel shader is working with a raster and thus can do a fine tune for pixels in each rendering picture. The graphic card can do such a calculation so as to remove green color.

The data that can be used for the calculation by the pixel shader can be set by the application program before rendering a frame. Before the pixel shader starts working, the application program has already saved a camera picture with a special "texture" for the reference of the pixel shader, and also store a color need to be filtered out, such as green color here, in the attributes thereof. In the meanwhile, the vertex shader sends some parameters to indicate which pixel is now rendered. In doing so, the pixel shader can get a pixel to be rendered from the "texture" which is combined with the camera picture.

If the data captured by the camera is a RGB format, it is converted into a YUV format by multiplying it with a conversion matrix by means of the powerful vector calculation capability of the graphic card. Then, a distance between a vector representing the color of the pixel and a vector representing the color needs to be filtered as a reference color is calculated. The closer the distance is, the more transparent the pixel is. The farther the distance is, the less opaque the pixel is. This is implemented by modifying the alpha channel component of the pixel.

After the above steps, two steps of S4 and S5 are followed. In S4, the rendered texture object is bonded to a pre-set virtual background to obtain a bonded scene image information.

In step of S5, the bonded scene image information is encoded to generate a video stream for live broadcasting.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 3:
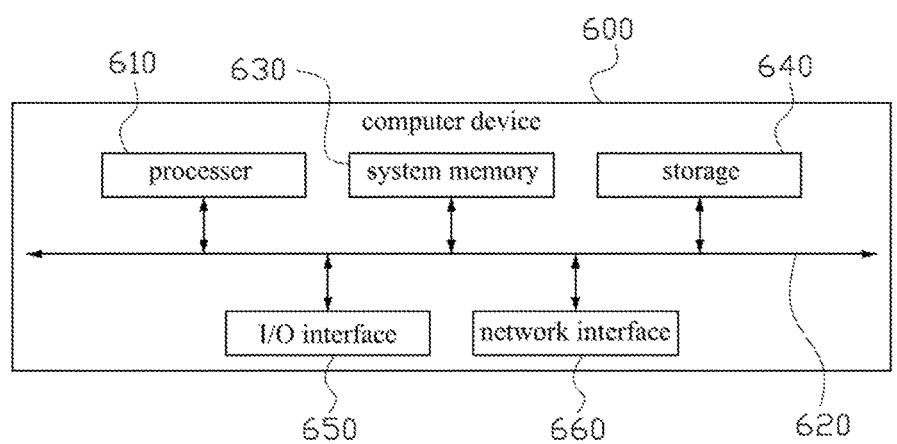
FIG. 3 is a diagram illustrating an example computing system that may be used in one embodiment of the present invention.

In at least some embodiments, a server or computing device that implements a portion or all of one or more of the technologies described herein, including the techniques to implement the functionality of the server 200, the client terminal 100, may include a general-purpose computer system that includes or is configured to access one or more computer-accessible media. FIG. 3 illustrates such a general-purpose computing device 600. In the illustrated embodiment, computing device 600 includes one or more processors 610 (which may be referred herein singularly as "a processor 610" or in the plural as "the processors 610") are coupled through a bus 620 to a system memory 630. Computing device 600 further includes a permanent storage 640, an input/output (I/O) interface 650, and a network interface 660.

In various embodiments, the computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 630 may be configured to store instructions and data accessible by processor(s) 610. In various embodiments, system memory 630 may be implemented using any suitable memory technology, such as static random access memory (SRAM), synchronous dynamic RAM (SDRAM), nonvolatile/Flash-type memory, or any other type of memory.

In one embodiment, I/O interface 650 may be configured to coordinate I/O traffic between processor 610, system memory 630, and any peripheral devices in the device, including network interface 660 or other peripheral interfaces. In some embodiments, I/O interface 650 may perform any necessary protocol, timing, or other data transformations to convert data signals from one component (e.g., system memory 630) into a format suitable for use by another component (e.g., processor 610). In some embodiments, I/O interface 650 may include support for devices attached through various types of peripheral buses, such as a variant of the Peripheral Component Interconnect (PCI) bus standard or the Universal Serial Bus (USB) standard, for example. In some embodiments, the function of I/O interface 650 may be split into two or more separate components, such as a north bridge and a south bridge, for example. Also, in some embodiments some or all of the functionality of I/O interface 650, such as an interface to system memory 630, may be incorporated directly into processor 610.

Network interface 660 may be configured to allow data to be exchanged between computing device 600 and other device or devices attached to a network or network(s). In various embodiments, network interface 660 may support communication via any suitable wired or wireless general data networks, such as types of Ethernet networks, for example. Additionally, network interface 660 may support communication via telecommunications/telephony networks such as analog voice networks or digital fiber communications networks, via storage area networks such as Fibre Channel SANs or via any other suitable type of network and/or protocol.

In some embodiments, system memory 630 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 600 via I/O interface 650. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 600 as system memory 630 or another type of memory.

Further, a computer-accessible medium may include transmission media or signals such as electrical, electromagnetic or digital signals, conveyed via a communication medium such as a network and/or a wireless link, such as may be implemented via network interface 660. Portions or all of multiple computing devices may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A mobile computing device for a live web-based broadcast, comprising;
    a camera configured to capture real-time graphics data;
    a processor; and
    a memory communicatively coupled to the processor and storing instructions that upon execution by the processor cause the mobile computing device to:
        intercept at least one frame of real-time graphics data from the real-time graphics data captured by the camera;
        store at least one texture object based on the at least one frame of real-time graphics data, the at least one texture object comprising a plurality of pixels;
        filter out a reference color from the plurality of pixels in the at least one texture object;
        create scene image data by integrating the at least one texture object into a pre-determined virtual background;
        generate a bit stream for a live web-based broadcast by encoding the scene image data;
        transmit over a network to a server computer the bit stream for the live broadcast;
    wherein the memory further stores instructions that upon execution by the processor cause the mobile computing system to:
        assign one of a plurality of colors as the reference color;
        determine a differential value between a color of one of the plurality of pixels and the reference color;
        normalize the differential value; and
        determine an alpha channel value of the one of the plurality of pixels using a normalized differential value of the one of the plurality of pixels.

2. The mobile computing device of claim 1, the memory further storing instructions that upon execution by the processor cause the mobile computing device to:
    in response to a determination that the at least one frame of real-time graphics data has a RGB format, convert the RGB format into a YUV format prior to storing the at least one texture object.

3. The mobile computing device of claim 1, the memory further storing instructions that upon execution by the processor cause the mobile computing device to:
    in response to a determination that the at least one frame of real-time graphics data has a YUV format, directly store the at least one texture object based on the at least one frame of real-time graphics data.

4. The mobile computing system of claim 1, the memory further storing instructions that upon execution by the processor cause the mobile computing system to:
    enable a user to select one of a plurality of colors as the reference color.

5. The mobile computing system of claim 1, wherein the reference color is green.

6. A method for a live web-based broadcast, comprising:
    intercepting at least one frame of real-time graphics data from real-time graphics data captured by a camera;
    storing at least one texture object based on the at least one frame of real-time graphics data, the at least one texture object comprising a plurality of pixels;
    filtering out a reference color from the plurality of pixels in the at least one texture object;
    creating scene image data by integrating the at least one texture object into a pre-determined virtual background;
    generating a bit stream for a live web-based broadcast from encoding the scene image data;

transmitting over a network to a server computer the bit stream for the live broadcast;
wherein the method further comprises:
assigning one of a plurality of colors as the reference color;
determining a differential value between a color of one of the plurality of pixels and the reference color;
normalizing the differential value; and
determining an alpha channel value of the one of the plurality of pixels using a normalized differential value of the one of the plurality of pixels.

7. The method of claim 6, further comprising:
in response to a determination that at least one frame of real-time graphics data has a RGB format, converting the RGB format into a YUV format prior to storing the at least one texture object.

8. The method of claim 6, further comprising:
in response to a determination that the at least one frame of real-time graphics data has a YUV format, directly storing the at least one texture object based on the at least one frame of real-time graphics data.

9. The method of claim 6, further comprising:
enabling a user to select one of a plurality of colors as the reference color.

10. The method of claim 8, wherein the reference color is green.

11. The method of claim 10, further comprising:
receiving, by the server computer, a request for watching the live broadcast.

12. A non-transitory computer-readable storage medium bearing computer-readable instructions that upon execution on a computing device cause the computing device at least to:
intercept at least one frame of real-time graphics data from real-time graphics data captured by a camera;
store at least one texture object based on the at least one frame of real-time graphics data, the at least one texture object comprising a plurality of pixels;
filter out a reference color from the plurality of pixels in the at least one texture object;
create scene image data by integrating the at least one texture object into a pre-determined virtual background;
generate a bit stream for a live web-based broadcast from encoding the scene image data;
transmit over a network to a server computer the bit stream for the live broadcast;
wherein the non-transitory computer-readable storage medium further comprises computer-readable instructions that upon execution on the computing device cause the computing device at least to:
assign one of a plurality of colors as the reference color;
determine a differential value between a color of one of the plurality of pixels and the reference color;
normalize the differential value; and
determine an alpha channel value of the one of the plurality of pixels using a normalized differential value of the one of the plurality of pixels.

13. The non-transitory computer-readable storage medium of claim 12, further comprising computer-readable instructions that upon execution on the computing device cause the computing device at least to:
in response to a determination that the at least one frame of real-time graphics data has a RGB format, convert the RGB format into a YUV format prior to storing the at least one texture object.

14. The non-transitory computer-readable storage medium of claim 12, further comprising computer-readable instructions that upon execution on the computing device cause the computing device at least to:
enable a user to select one of a plurality of colors as the reference color.

\* \* \* \* \*